United States Patent [19]

Kalfoglou

[11] 4,219,082

[45] Aug. 26, 1980

[54] LIGNOSULFONATE-FORMALDEHYDE CONDENSATION PRODUCTS AS ADDITIVES IN OIL RECOVERY PROCESSES INVOLVING CHEMICAL RECOVERY AGENTS

[75] Inventor: George Kalfoglou, Houston, Tex.

[73] Assignee: Texaco Inc., White Plains, N.Y.

[21] Appl. No.: 23,128

[22] Filed: Mar. 23, 1979

[51] Int. Cl.$^2$ .................................. E21B 43/22
[52] U.S. Cl. ........................ 166/273; 166/274; 166/275
[58] Field of Search ........... 166/273, 274, 275, 305 R; 252/8.55 D

[56] References Cited

U.S. PATENT DOCUMENTS

| | | | |
|---|---|---|---|
| 1,823,440 | 9/1931 | DeGroote | 252/8.55 D |
| 2,843,545 | 7/1958 | Wolf | 166/275 |
| 3,384,171 | 5/1968 | Parker | 166/274 |
| 4,005,749 | 2/1977 | Birk et al. | 166/273 |
| 4,006,779 | 2/1977 | Kalfoglou | 166/275 |
| 4,072,192 | 2/1978 | Kudchadker et al. | 166/273 |
| 4,088,584 | 5/1978 | Smalley et al. | 252/8.55 D |
| 4,133,385 | 1/1979 | Kalfoglou | 166/273 |
| 4,142,582 | 3/1979 | kalfoglou | 166/273 |
| 4,157,115 | 6/1979 | Kalfoglou | 166/274 |

*Primary Examiner*—Stephen J. Novosad
*Assistant Examiner*—George A. Suchfield
*Attorney, Agent, or Firm*—Carl G. Ries; Robert A. Kulason; Kenneth R. Priem

[57] ABSTRACT

A process for producing petroleum from subterranean formations is disclosed wherein production from the formation is obtained by driving a fluid from an injection well to a production well. The process involves injecting via the injection well into the formation an aqueous solution of lignosulfonate-formaldehyde condensation products as a sacrificial agent to inhibit the deposition of surfactant and/or polymer on the reservoir matrix. The process may best be carried out by injecting the lignosulfonate-formaldehyde condensation products into the formation through the injection well mixed with either a polymer, a surfactant solution and/or a micellar dispersion. This mixture would then be followed by a drive fluid such as water to push the chemicals to the production well.

15 Claims, No Drawings

LIGNOSULFONATE-FORMALDEHYDE CONDENSATION PRODUCTS AS ADDITIVES IN OIL RECOVERY PROCESSES INVOLVING CHEMICAL RECOVERY AGENTS

BACKGROUND OF THE INVENTION

1. Field of the Invention

This invention relates to the recovery of oil from subterranean formations by chemical flooding methods.

2. Description of the Prior Art

Petroleum is frequently recovered from subterranean formations or reservoirs by permitting the natural energy of the reservoir to push the petroleum up through wells to the surface of the earth. These processes are referred to as primary recovery methods since they use the natural energy of the reservoir. However, a large amount of oil, generally in the range of 65-90% or more, is left in the subterranean formation at the conclusion of the primary recovery program. When the natural reservoir energy is unable to produce more petroleum, it is a common practice to resort to some form of supplemental recovery technique in order to recover additional petroleum left in the subterranean formation. These supplemental operations are normally referred to as secondary recovery operations. If this supplemental recovery operation is the second in a series of such operations, it will be referred to as a tertiary recovery operation. However, the terminology is unimportant for the purposes of this application and relates only to the sequence in which they are carried out.

The most widely used supplemental recovery technique because of its ease of implementation and low capital outlay is water flooding through injection wells drilled into the subterranean formation. In a water flooding operation, the injected fluid displaces oil through the formation to be produced from the injection well. A major disadvantage to water flooding, however, is its relatively poor displacement efficiency largely due to the fact that water and oil are immiscible at reservoir conditions and high interfacial tension exists between the flood water and the oil. For this reason, after a water flood, a large portion of the oil is still left unrecovered in the reservoir.

It has been recognized by those skilled in the art that a solution effecting a reduction in this interfacial tension between water and oil would provide a much more efficient recovery mechanism. Therefore, the inclusion of a surface active agent or surfactant in the flood water was recognized as an acceptable technique for promoting displacement efficiency of the reservoir oil by the water. For example, U.S. Pat. No. 3,468,377 discloses the use of petroleum sulfonates in water flooding operations and U.S. Pat. No. 3,553,130 discloses the use of ethylene oxide adducts of alkyl phenols for the same purpose. The use in water flooding operations of water soluble surface active alkaline earth resistant polyglycol ethers is disclosed in U.S. Pat. No. 2,233,381. Other specialized surfactants, as will be discussed later, have been discovered to have special properties useful in water flooding operations such as a tolerance for high salinity and calcium, and/or magnesium ion concentrations often found in reservoir waters.

However, field operations employing surfactants and surface active agents in injected fluid have not always been entirely satisfactory due to the fact that these materials are often adsorbed by the formation rock to a relatively high degree, resulting in an ever declining concentration of the materials as they progress through the reservoir. Therefore, large concentrations of surface active materials have heretofore been necessary to maintain a sufficient concentration at the oil-water interface. Due to this, many proposed flooding operations involving surface active materials have been uneconomical.

Another serious problem for any recovery technique involving the driving of oil with a fluid is premature breakthrough of the injection fluid. This premature breakthrough indicates that the reservoir has not been adequately swept of oil. The problem is often described in terms of sweep efficiency as distinguished from the displacement efficiency described above. Displacement efficiency involves a microscopic pore by pore efficiency by which water displaces oil, whereas sweep efficiency is related to the portion of the reservoir which is swept and unswept by the injected fluid. A major cause of poor sweep efficiency is associated with the fact that the injected fluid generally has a lower viscosity than the displaced fluid (petroleum). Thus, the injected fluid has a higher mobility and tends to finger through the oil, prematurely breaking through to the production well.

One solution to this high mobility problem is to increase the viscosity of the driving fluid. A way to do this is to add polymeric organic materials to a driving water which has the effect of increasing the viscosity of the water, thereby increasing the sweep efficiency of the supplemental recovery process. U.S. Pat. No. 3,039,529 and U.S. Pat. No. 3,282,337 teach the use of aqueous polyacrylamide solutions to increase the viscosity of the injected fluid thereby promoting increase sweep efficiency. Polysaccharides as taught in U.S. Pat. No. 3,581,824 have been used for the same purpose. These polymers are quite expensive and any polymer lost to adsorption on the reservoir matrix adds substantially to the cost since additional polymer is required to maintain a given viscosity.

The above described problems have been recognized by those skilled in the art of oil recovery and certain sacrificial compounds have been added to pretreat the formation in order to decrease the adsorption of subsequently injected surfactants and/or polymers. For example, U.S. Pat. No. 3,424,054 discloses the use of aqueous solutions of pyridine; U.S. Pat. No. 3,469,630 discloses the use of sodium carbonate and inorganic polyphosphates, and U.S. Pat. No. 3,437,141 discloses the use of soluble carbonates, inorganic polyphosphates and sodium borate in combination with saline solution of a surfactant having both a high and a low molecular weight component. These materials have not been completely satisfactory from a standpoint of performance and economics however.

SUMMARY OF THE INVENTION

The invention is a process of producing petroleum from subterranean formation having an injection well and a production well in communication therewith. The process comprises injecting into the formation via the injection well an aqueous solution of lignosulfonate-formaldehyde condensation products in conjunction with a chemical oil recovery agent, for example, surfactant, polymer and/or a micellar dispersion. It is the usual practice to then inject a fluid such as water to sweep the chemical components through the reservoir to the production well, thereby displacing oil from the subterranean formation to the surface of the earth.

DESCRIPTION OF THE PREFERRED EMBODIMENTS

A sacrificial material is injected by the process of this invention through an injection means comprising one or more injection wells into a subterranean petroleum-containing formation to preferably occupy or cover all potential adsorption sites of the rock within the subterranean formation thereby reducing the extent of adsorption of the more expensive chemical oil recovery agent injected therewith. A sacrificial agent performs best when it exhibits high adsorption on active sites of rock surfaces, and thus diminishes surfactant and/or polymer adsorption. Chemical compounds of polyelectrolytic nature have the proper physico chemical and structural requirements to behave as successful sacrificial agents. The functional group on the sacrificial agent molecules enhances adsorption either by hydrogen bonding or electrostatic attraction to active sites on the rock surfaces.

A satisfactory sacrificial material has at least three important characteristics. First, it should be less expensive than the polymer or surfactant on a cost effectiveness basis since it is to be sacrificed or adsorbed by the formation, probably not to be recovered. Next, it must be adsorbed readily by the subterranean formation matrix. Preferably the sacrificial material should be adsorbed more readily than the chemical oil recovery agent to be used in the process. The third important characteristic of a sacrificial agent is that the presence of such adsorbed sacrificial material should retard or eliminate adsorption of the surfactant and/or polymer chemical recovery material on the adsorption sites of the formation rock. By adsorption sites of the formation rock it is meant those parts of the surfaces of the pores of the formation rock capable of adsorbing a chemical compound from a solution on contact.

The sacrificial material may not have a detrimental effect on the recovery efficiency of the chemical flooding operation. Additional oil is usually recovered only if the sacrificial material is followed by or is admixed with a surfactant and/or a polymer chemical recovery agent which will effectively increase the amount of oil displaced from the subterranean formation. In one embodiment of my invention, surfactant is chosen as the chemical recovery agent. The surfactant should be injected in admixture with the sacrificial agent for best results and ahead of the following flooding water thereby achieving the desired interfacial tension reduction between the injected fluid and the displaced fluid with minimal loss of surfactant on the formation matrix. The surfactant may be present in a hydrocarbon solvent or in an aqueous or in a combination thereof. Any anionic, nonionic and/or cationic type surfactant effective for recovering oil may be used in this invention.

The amount of surfactant which must be employed in the practice of any chemical flood is generally known in the art and is to be found in published literature. However, the slug size of surfactant generally will range from about 0.01 to 1 pore volumes of an aqueous surfactant solution having dissolved therein from about 0.01 to about 10.0 percent by weight of the surfactant itself.

Another embodiment of my invention is the use of lignosulfonate-formaldehyde condensation products in conjunction with an emulsion of water, hydrocarbon and surfactant, i.e. a micellar dispersion. The same parameters as discussed above for simple aqueous surfactant solutions would apply to micellar dispersions. Micellar dispersions are known in the art. See, for example, U.S. Pat. No. 3,536,136 incorporated here by reference.

In another embodiment of my invention, the sacrificial agent disclosed herein is used in conjunction with polymeric materials which lower the mobility ratio and increase the sweep efficiency of the displacing fluid. For example, U.S. Pat. No. 3,039,529 discloses the use of polyacrylamide solutions for this purpose, and U.S. Pat. No. 3,581,824 discloses the use of polysaccharides. Other polymeric materials known to those skilled in the art are useful as well, and the specific examples above are given only for illustration.

The method of my invention includes the use of lignosulfonate formaldehyde condensation products in conjunction with one or a combination of two or more types of chemical recovery agents especially those discussed above.

In my invention the sacrificial agent is preferably injected in admixture with the chemical recovery agent(s) into the petroleum formation. This chemical recovery agent/sacrificial agent mixture may or may not be preceded by a slug of sacrificial material in aqueous solution only. A preflush of sacrificial agent followed by chemical recovery agent is also included in my invention but may not perform as well as other embodiments although it will generally show an improvement over using no sacrificial agent.

In any of these embodiments and others which are obvious to those skilled in the art, the chemical recovery agent containing slug may be followed by a material to taper the viscosity before drive water is injected. This technique known well to those skilled in the art prevents the water from fingering into the more viscous chemical recovery agent slug.

The sacrificial agents useful in the process of my invention are lignosulfonate-formaldehyde condensation products. Lignosulfonates are anionic polyelectrolytes soluble in water and tolerate hard water (polyvalent ions, e.g. calcium and magnesium). They are also thermally stable in formations where the temperature is high. Lignosulfonates are macro-molecules built up by complex condensation of phenyl propane units. The sulfonate groups are attached to the aliphatic side chain, mainly to alpha carbon. Lignosulfonates are water soluble with molecular weights ranging from several thousand to around 50,000 or more. They are economically attractive since being by-products of the pulping industry, they are plentiful and cost less than either the surfactants or the polymers used in enhanced oil recovery methods. The polyelectrolyte lignosulfonates with strongly ionized sulfonate groups are negatively charged species and have a tendency to adsorb on solid surfaces thereby imparting a negative charge to them. The rock surfaces of a reservoir treated with lignosulfonate will be inert towards the anionic surfactants in the flood water and therefore loss of surfactants to the rock surfaces will be kept to a minimum. The same phenomenon will occur with the polymer thickened drive fluid.

Lignin is second only to cellulose as the principal constituent in wood. Generally, lignin is a complex phenolic polyether containing many different functional groups including carboxyls, carbonyls, and alcoholic and phenolic hydroxyls. Lignins and their derivatives are described in Kirt-Othmer Encyclopedia of Chemical Technology, Second Edition, Vol. 12, beginning at page 362. This publication describes two very broad classes of lignin derivatives: sulfite lignins and alkali lignins.

The difference in the lignins exists because of the method of extraction of lignin material from woody materials. Sulfonated alkali lignins are readily available commercially from various sources including but not limited to West Virginia Pulp and Paper Company under the trade name REAX. Their general method of preparation is described in the Encyclopedia of Chemical Technology referred to above. Briefly, sulfonated alkali lignins are prepared by cooking woodchips with a 10% solution of a mixture of sodium hydroxide with about 20 mole percent of sodium sulfide. The lignin with wood is modified into a sodium compound often termed sodium lignate or alkali lignin which is very soluble in the strongly alkaline solution. These alkali lignins are removed from solution by lowering the pH which precipitates out the alkali lignins. These unsulfonated alkali lignins are sold under various tradenames including INDULIN. These alkali lignins are used to prepare the sulfonated derivatives. Methods of sulfonation are known by those skilled in the art. One typical method involves treating the alkali lignins with a solution of alkali sulfites at elevated temperature and pressure. The degree of sulfonation may be controlled to provide a variety of sulfonated alkali lignins.

The other main type of lignin derivatives are called sulfite lignins or sulfite lignosulfonates. Sulfite lignins are generally made by cooking woodchips under pressure in a solution of sulfurous acid and calcium, magnesium, sodium or ammonium bisulfite. This process converts insoluble lignins to soluble lignosulfonic acid. The lignosulfonic acids or calcium, magnesium, sodium or ammonium salts of the lignosulfonic acids are available under various tradenames including MARASPERSE, LIGNOSITE, ORZAN, TORANIL, and RAYFLO.

The broad term lignosulfonates used herein refers to both sulfonated alkali lignins and sulfite lignosulfonates (sulfite lignins). These are distinct types of compounds as explained above. Since the alkali lignins require sulfonation after extraction of the material from woody products it is proper to call them sulfonated alkali lignins. Likewise since sulfite lignins emerge from the extraction process already sulfonated it is proper to refer to this class of materials as sulfite lignins or sulfite lignosulfonates.

My invention is the use of formaldehyde condensation products of sulfonated alkali lignins and/or sulfite lignosulfonates. Lignosulfonates having degrees of sulfonation from about 2.0 to saturation are acceptable as starting materials for the lignosulfonate-formaldehyde condensation products of my invention. Cations which are acceptable include $Na^+$, $K^+$, $NH_4^+$, $CA^{++}$, and $Mg^{++}$. The degree of sulfonation is the weight percentage of sulfonate ($SO_3^-$) compared to the total molecular weight.

Lignosulfonates polymerized with formaldehyde will have the needed molecular size to exhibit high adsorption on rock surfaces, and therefore perform as better sacrificial agents in surfactant systems.

Lignosulfonate-formaldehyde condensation products may be improved by either using modified lignosulfonates as the starting compound and then condensing with formaldehyde or by modifying the lignosulfonate-formaldehyde condensation products. The salt and hard water tolerance of lignosulfonate-formaldehyde condensation products can be improved by sulfomethylating the lignosulfonate-formaldehyde condensation products. On the other hand, higher molecular size lignosulfonates may be obtained by first oxidizing the lignosulfonate (See U.S. Pat. No. 4,133,385) and then condensing it with formaldehyde. Carboxylated lignosulfonates (See application Ser. Nos. 900,691 and 900,692, now U.S. Pat. No. 4,172,497, filed Apr. 27, 1978) may also be used as the compound prior to condensation in order to obtain carboxylated lignosulfonate-formaldehyde condensation products as a final product.

Both sulfite lignosulfonates and sulfonated Kraft lignin can be utilized in the formaldehyde condensation reaction. The formaldehyde condensation reaction can either be alkali-catalyzed or acid-catalyzed. The alkali-catalyzed reaction does not yield a high molecular weight product and, therefore, the acid-catalyzed condensation is the preferred reaction.

In the acid catalyzed reaction formaldehyde attaches on the ortho position to the propyl group. Condensation of lignosulfonates with formaldehyde may be carried out, for example, by refluxing a lignosulfonate solution (about 6% w/w) for 24 hours or more with an aqueous formaldehyde solution (37%) and concentrated sulfuric acid. The reaction can be terminated at any time when the viscosity of the products reaches a preferred value. Lignosulfonate-formaldehyde reaction products obtained by terminating the reaction (methylolation) before intermolecular condensation occurs can also be used for the same purposes. Methylol groups can thus be introduced to the lignosulfonate structure, and enhance the effectiveness of the modified lignosulfonate as a sacrificial agent.

Norlig 92 g (softwood and desugared lignosulfonate) was condensed with formaldehyde as above and the product (supplied by American Can Co.) was tested as sacrificial agent with 1%, w/v Adduct D-30 PS* in 40,000 ppm TDS brine. Bottle tests were performed with 1%, w/v lignosulfonate solutions at 43° C. using crushed Slaughter core material as the adsorbent. The surfactant adsorption values are given below:

*Propane sulfonate derivative of the three (3) mole ethylene oxide adduct of dodecyl phenol.

| Lignosulfonate 1%, w/v | Surfactant Adsorbed mg/g |
|---|---|
| None | 4.9 |
| Norlig 92g-Formaldehyde Condensation Product | 1.7 |

Results indicate that the lignosulfonate-formaldehyde condensation product decreased surfactant adsorption from 4.9 to 1.7 mg/g of rock, and that it should perform as an effective sacrificial agent when utilized in surfactant flooding processes.

Crude unmodified lignosulfonates may be made with either softwoods or hardwoods. Although having basically the same functional groups the crude unmodified softwood lignosulfonates have more sulfonate and hydroxyl groups than the crude unmodified hardwood lignosulfonates. Thus, in general, crude unmodified softwood lignosulfonates have better hard water ($Ca^{++}$, $Mg^{++}$) tolerance than the hardwood form.

The quantity of lignosulfonate-formaldehyde condensation product to be injected into the subterranean hydrocarbon formation may be any amount up to and including an amount sufficient to occupy substantially all of the active sites of the formation matrix. If less than the maximum amount is used, there will be a corresponding increase in the adsorption of surfactant form injection solution onto the formation matrix although the amount of increase will not be as great as in the case where the formation is completely free of lignosulfonate salts. At a maximum, only the amount of lignosulfonate-formaldehyde condensation products needed to completely occupy the active sites on the formation matrix is needed. The detriment resulting from using excess lignosulfonate-formaldehyde condensation products would be an increase in the cost of operating the oil recovery program.

The amount of lignosulfonate-formaldehyde condensation products salts needed in the process of the invention depends on the particular formation, the area or pattern to be swept and other formation characteristics. Those skilled in the art can determine the exact quantity needed to afford the desired amount of protection.

Generally it has been found that the amount of lignosulfonate-formaldehyde condensation products in the surfactant slug will be effective in amounts of from about 0.01 to about 10.0 percent by weight of the total surfactant solution (including the aqueous portion). Total lignosulfonate-formaldehyde condensation products will be effective at the above concentrations in amounts ranging from 0.01 to 1.0 pore volumes of the aqueous solution of surfactant-sacrificial agent or only sacrificial agent solution.

ILLUSTRATIVE FIELD PROCEDURE

A carbonate reservoir at a depth of 5,000 feet with a porosity of 15% and a permeability of 50 md is water flooded to a residual oil saturation of 36%. In order to recover additional oil from the reservoir, a chemical flood comprising an aqueous 2.5% solution of lignosulfonate-formaldehyde condensate as described above and a 2.5% surfactant solution comprising 0.55% petroleum sulfonate of 497 equivalent weight, 1.2% petroleum sulfonate of 332 equivalent weight, and 0.75% of sulfonated 6.0 mole ethylene oxide adduct of nonyl phenol is pumped into the reservoir through an injection well in an amount comprising 0.3 pore volume of the reservoir. This slug of sacrificial agent surfactant solution is followed by an aqueous solution of 0.1% polysaccharide in a slug comprising 0.6 pore volume. The polysaccharide solution is followed by water and the entire chemical system is displaced to five (5) production wells surrounding the injection well. At the end of the chemical flood, the reservoir has an oil saturation of 16% representing a recovery of 56% additional oil.

I claim:

1. In a method for recovering oil from a subterranean formation containing oil and having an injection well and a production well wherein a chemical recovery agent is injected into the injection well in order to drive the oil to the production well wherein it is produced the improvement which comprises:
   injecting into the injection well in admixture with the chemical recovery agent lignosulfonate-formaldehyde condensation products wherein the lignosulfonate-formaldehyde condensation products are present in an amount effective for reducing the extent of adsorption of the surfactant by the formation matrix.

2. A method as in claim 1 wherein the chemical recovery agent is an aqueous surfactant solution.

3. A method as in claim 1 wherein the chemical recovery agent is a polymer.

4. A method as in claim 1 wherein the chemical recovery agent is a micellar dispersion.

5. A method as in claim 1 wherein the lignosulfonate-formaldehyde condensation products are present in amount sufficient to occupy substantially all of the active sites on the formation matrix.

6. A method for recovering oil from a subterranean formation containing oil and having an injection well and a production well comprising:
   (a) injecting through the injection well into the formation an aqueous solution of lignosulfonate-formaldehyde condensation products wherein the lignosulfonate-formaldehyde condensation products are present in an amount effective for reducing the extent of adsorption of the surfactant by the formation matrix,
   (b) subsequently injecting into the formation via the injection well a chemical recovery agent also containing lignosulfonate-formaldehyde condensation products as above and
   (c) producing oil from the formation via the production well.

7. A method as in claim 6 wherein the solution of step (b) is followed by blooding water.

8. A method as in claim 6 wherein the chemical recovery agent is an aqueous surfactant solution.

9. A method as in claim 6 wherein the chemical recovery agent is a polymer.

10. A method as in claim 6 wherein the chemical recovery agent is a micellar dispersion.

11. A method for recovering oil from a subterranean formation containing oil and having an injection well and a production well comprising:
   (a) injecting through the injection well into the formation an aqueous solution of lignosulfonate-formaldehyde condensation products wherein the lignosulfonate-formaldehyde condensation products are present in an amount effective for reducing the extent of adsorption of the surfactant by the formation matrix,
   (b) subsequently injecting into the formation via the injection well a chemical recovery agent and
   (c) producing oil from the formation via the production well.

12. A method as in claim 11 wherein the surfactant solution of step (b) is followed by flooding water.

13. A method as in claim 11 wherein the chemical recovery agent is an aqueous surfactant solution.

14. A method as in claim 11 wherein the chemical recovery agent is a polymer.

15. A method as in claim 11 wherein the chemical recovery agent is a micellar dispersion.

* * * * *